No. 718,096. PATENTED JAN. 13, 1903.
L. J. COOK.
VEHICLE WHEEL.
APPLICATION FILED SEPT. 22, 1902.
NO MODEL.
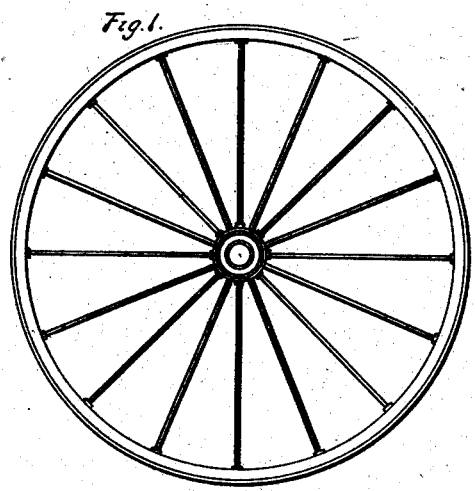
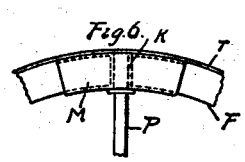
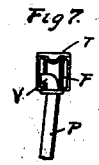
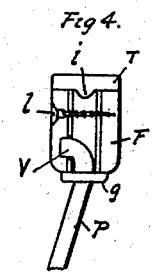
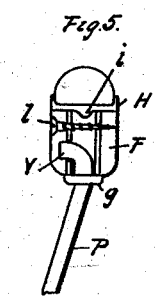
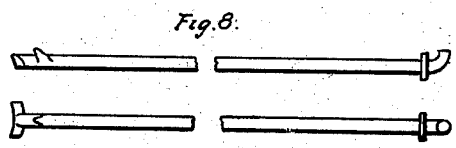
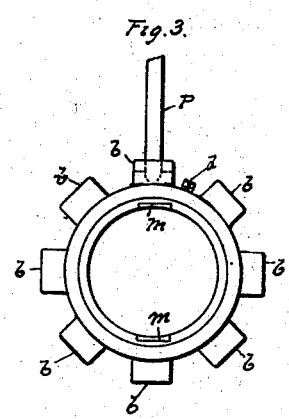
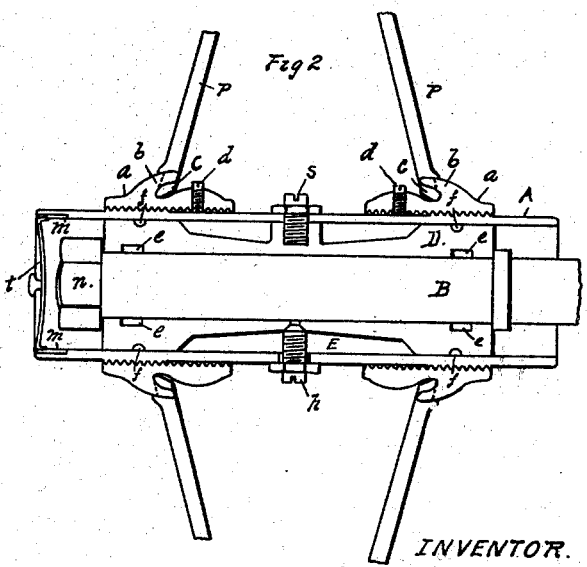
WITNESSES
Fred R Dowsett.
Frank B Jones.
INVENTOR.
Lewis J. Cook
by F. M. Metcalf
attorney.

UNITED STATES PATENT OFFICE.

LEWIS J. COOK, OF BATTLECREEK, MICHIGAN.

VEHICLE-WHEEL.

SPECIFICATION forming part of Letters Patent No. 718,096, dated January 13, 1903.

Application filed September 22, 1902. Serial No. 124,311. (No model.)

*To all whom it may concern:*

Be it known that I, LEWIS J. COOK, a citizen of the United States, residing at Battlecreek, in the county of Calhoun and State of Michigan, have invented certain new and useful Improvements in Vehicle-Wheels, of which the following is a specification, reference being had therein to the accompanying drawings.

My invention relates to that class of wheels in which the rim or felly is firmly clamped and locked within the tire by longitudinal compression of the spokes.

The object of my invention is to provide a simple, strong, and durable wheel that may be kept in continued service without the aid of wheelwright or blacksmith and the vexatious expense and delay always attending such operations.

To the attainment of the foregoing and other useful ends, I employ a construction allowing easy and quick adjustment to take up slack caused by vibration or wear, accessibility of parts for ready removal to repair or replace, and arrange felly and tire fastenings without the use of bolts and nuts, which are liable to work loose, rattle, or fall off. I also provide an ample oil-reservoir within the hub having an adjustable feed to the interior bearings and dust-excluding devices protecting each end of the journals.

In the accompanying drawings, in which like letters of reference denote similar parts, Figure 1 represents a complete wheel built on my improved plan. Fig. 2 is a sectional view of the hub with portions of the spokes attached. Fig. 3 is an end view of the hub. Fig. 4 is a section through felly, tire, and spoke-thimble with end of spoke inserted. Fig. 5 is a similar view showing a steel band substituted for the ordinary metal tire in order to allow the use of rubber or other resilient material for the wheel-tread. Fig. 6 is a segment of the wheel-rim, showing the metal sleeve used to join the ends of felly with contained thimble and spoke end. Fig. 7 is a sectional view of the same. Fig. 8 illustrates the spoke ends and shows manner of lug attachment to hub and thimble.

A is the hub-sleeve, to which are fitted the collars $a$ $a$, provided with right and left threads, respectively, and these collars are provided with crotch-lugs $b$ $b$ upon their outer circumference to engage the spoke-lugs $c$ $c$. The collars $a$ $a$ are further provided with set-screws $d$ $d$ to secure them in adjustment.

B is the axle; $n$, the retaining end nut.

D is a removable box provided with internal recesses $e$ $e$ near each end for the reception of felt washers to exclude dust from axle-bearing. This box is attached to hub-sleeve by set-screw $s$, and upon the outer periphery are made the annular grooves $f$ $f$, intended to be filled with sulfur or similar material to make an oil-tight joint.

E is an interior cavity formed between the box and sleeve for reception of oil, the flow of which to bearings is to be regulated by the valve-screw $h$.

$m$ $m$ are slots in the end of the hub-sleeve for wrench engagement.

$t$ is the hub-cap to protect nut and exclude dust.

$p$ $p$ are the spokes, provided with collars $q$ $q$ and teats $v$ $v$ at their upper or rim ends and with lugs $c$ $c$ at their lower or hub ends.

F is the felly; T, the tire.

H is a band for attaching rubber tires.

$i$ is an inside rib provided to prevent lateral movement between the tire or band and felly.

K is the spoke-thimble, attached to felly by screws $l$ and provided with a lateral hole to receive the spoke-teat $v$.

M is a metal sleeve for uniting ends of felly and through which one of the spoke-thimbles K is riveted.

In the construction of this wheel the spokes are removably hooked to the crotch-lugs of hub at center and thimble-holes at rim in such manner that they are securely locked to rim and hub when in position that they may be able to resist tension as well as thrust strains, thus retaining the hub central by suspension as well as compression. The sleeve connections of felly are so formed and retained that the joint of same, usually the weakest point of the rim, is made as strong as the strongest and provided with spoke-support at this place. At the same time the ends are free to take separate motion, if required. The proper spoke compression is secured by drawing the hub-collars together by rotating the box and sleeve within the collars by means of a wrench engagement at end slots $m\,m$. When the action of the right and left threads has thus produced the desired effect, the collars are to be secured in adjustment by means of set-screws $d\ d$.

The interior parts of my wheel are preferably embraced and clamped within an endless tire; but I do not confine myself to that form, as I may employ a lapped and riveted joint instead of welding the band in the usual manner.

The manner of construction is so clearly illustrated that extended description is not deemed necessary.

Obviously the wheel can be most readily taken entirely apart and quickly reassembled without danger of breaking or weakening any of its integral parts.

Having thus fully illustrated and described my improvement, what I claim as new, and desire to secure by Letters Patent of the United States, is—

1. In a vehicle-wheel, a hub-sleeve having external right and left threaded portions near each end, a pair of spoke-collars engaging therewith provided with crotch-lugs and set-screws, a felly provided with spoke-thimbles and end sleeves each sleeve embracing a spoke-thimble riveted within the same, a tire provided with an inside rib engaging a corresponding groove in the felly, together with a set of spokes having lugs, collars and teats, the whole made and arranged substantially as shown and described.

2. In a vehicle-wheel, a felly containing spoke-thimbles having side holes for hook engagement with spokes and having its ends embraced by retaining-sleeves with spoke-thimbles riveted therein, a central groove upon its outer periphery, the whole surrounded by a tire having an inside rib fitting within the felly-groove, substantially as shown and described.

3. A vehicle-wheel having a spoke-expanding hub formed with a pair of right and left threaded collars operating upon the same, each collar having crotch-lugs for spoke engagement, and a raised portion or rib inside to assist in locking spokes to hub, a set of spokes provided at their inner or hub ends with lugs for engagement with the adjustable collars, and hook-tips at their outer or rim ends for engagement with side holes in spoke-thimbles, each spoke being further provided with an enlargement or shoulder near its outer end for thrust-bearing against the felly and thimble, the whole surrounded with a felly having spoke-thimbles with side holes, and embraced within the tire, substantially as shown and described.

In testimony whereof I affix my signature in presence of two witnesses.

LEWIS J. COOK.

Witnesses:
JESSE ARTHUR,
R. C. SPOHR.